United States Patent
Zhu et al.

(10) Patent No.: US 11,066,974 B2
(45) Date of Patent: Jul. 20, 2021

(54) INTERNAL COMBUSTION ENGINE WASTE HEAT UTILIZATION SYSTEM

(71) Applicant: Lin Zhu, Shangqiu (CN)

(72) Inventors: Zhenzhen Zhu, Shangqiu (CN); Lin Zhu, Shangqiu (CN)

(*) Notice: Subject to any disclaimer, the term of this patent is extended or adjusted under 35 U.S.C. 154(b) by 0 days.

(21) Appl. No.: 16/899,675

(22) Filed: Jun. 12, 2020

(65) Prior Publication Data
US 2020/0300147 A1  Sep. 24, 2020

Related U.S. Application Data

(63) Continuation of application No. PCT/CN2018/123077, filed on Dec. 24, 2018.

(30) Foreign Application Priority Data

Dec. 28, 2017  (CN) .......................... 201711457764.3

(51) Int. Cl.
| | | |
|---|---|---|
| F01N 5/02 | (2006.01) | |
| F01K 23/06 | (2006.01) | |
| F01K 25/08 | (2006.01) | |
| F02G 5/02 | (2006.01) | |

(52) U.S. Cl.
CPC .............. F01N 5/02 (2013.01); F01K 23/065 (2013.01); F01K 25/08 (2013.01); F02G 5/02 (2013.01)

(58) Field of Classification Search
CPC . F01N 5/02; F01N 5/00; F01K 23/065; F01K 7/26; F02G 5/02; F02G 5/04
See application file for complete search history.

(56) References Cited

U.S. PATENT DOCUMENTS

| | | | |
|---|---|---|---|
| 10,336,193 B2 | 7/2019 | Ben Ahmed et al. | |
| 2009/0320477 A1* | 12/2009 | Juchymenko | F01K 23/065 60/651 |
| 2013/0199178 A1* | 8/2013 | Kanou | F02G 5/02 60/605.2 |
| 2014/0013743 A1* | 1/2014 | Dane | F01N 9/00 60/615 |
| 2015/0275698 A1* | 10/2015 | Kawai | F01K 23/101 60/604 |

(Continued)

FOREIGN PATENT DOCUMENTS

| | | |
|---|---|---|
| CN | 201003434 Y | 1/2008 |
| CN | 101285432 A | 10/2008 |
| CN | 102606289 A | 7/2012 |

(Continued)

OTHER PUBLICATIONS

Internation Search Report of PCT/CN2018/123077, dated Mar. 7, 2019.

*Primary Examiner* — Jonathan R Matthias
(74) *Attorney, Agent, or Firm* — Erson IP (Nelson IP)

(57) ABSTRACT

An internal combustion engine waste heat utilization system comprises a cooling medium, a cooling medium storage tank (9), a cooling medium delivery pipe (8), a circulation pump (7), a high-pressure pipeline (15), energy storage tanks (14, 12), steam turbines (13,11) and a radiator (10). The cooling medium forms high-temperature and high-pressure gas by absorbing waste heat of an internal combustion engine and exhaust gas, so as to drive the steam turbines to do work and convert thermal energy into kinetic energy.

1 Claim, 1 Drawing Sheet

(56) References Cited

U.S. PATENT DOCUMENTS

2016/0326981 A1 11/2016 Kolb et al.
2020/0088069 A1 3/2020 Neunteufl et al.

FOREIGN PATENT DOCUMENTS

| CN | 104265502 A | 1/2015 |
| CN | 107893710 A | 4/2018 |
| CN | 207795421 U | 8/2018 |

\* cited by examiner

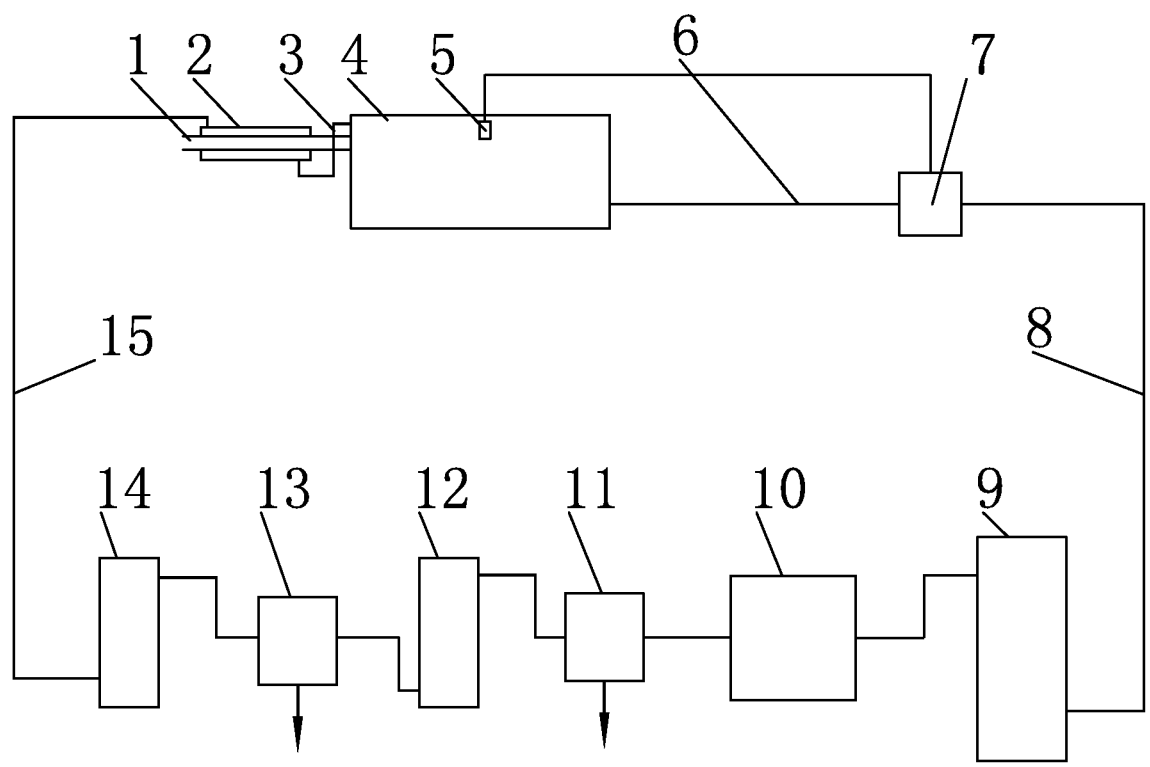

INTERNAL COMBUSTION ENGINE WASTE HEAT UTILIZATION SYSTEM

CROSS-REFERENCE TO RELATED APPLICATIONS

This application is a continuation of International Patent Application No. PCT/CN2018/123077 with a filing date of Dec. 24, 2018, designating the United States, and further claims priority to Chinese Patent Application No. 201711457764.3 with a filing date of Dec. 28, 2017. The content of the aforementioned applications, including any intervening amendments thereto, are incorporated herein by reference.

TECHNICAL FIELD

The present invention relates to a high-efficiency and energy-saving internal combustion engine waste heat utilization technology.

BACKGROUND OF THE PRESENT INVENTION

According to the statistics, the direct fuel efficiency of mainstream mass-production gasoline internal combustion engines is about 30% currently. A small quantity of mass-production engines that use supercharging technology can achieve direct fuel efficiency of about 40%, such as advanced mass-production gasoline engines of BMW. The bottleneck that restricts the efficiency mainly includes technical and physical problems such as friction to be overcome for doing work, fuel sufficiency, and the like, as well as many factors such as cycle efficiency, mechanical efficiency, combustion efficiency, gas chamber efficiency, air tightness efficiency and manufacturing technology. At present, many laboratories and automobile manufacturers strive for increasing the comprehensive efficiency, such as composite ceramic cylinder technology, thermoelectric conversion (energy recovering technology), supercharging technology, fuel efficiency (ignition and atomization), and the like. Some technologies have theoretical high efficiency of about 60%, mainly including low friction technology and hybrid power output of thermoelectric conversion (the power output efficiency of a whole vehicle is strictly not the direct efficiency of the engine). In essence, the internal combustion engine is a very wasteful mechanical device: Only ⅓ of the energy included in the fuel is converted into mechanical motion by the internal combustion engine to drive the vehicle. Part of the rest of the energy is wasted through an exhaust pipe; and in order to prevent the temperature of the internal combustion engine from being too high during operation, part of the heat absorbed by circulation liquid is dissipated at a cooling fin.

SUMMARY OF PRESENT INVENTION

Technical Problem

In order to increase the fuel efficiency of automobiles and save energy, the currently common methods mainly include the use of fuel treasure, turbocharging and frequent cleaning of gas lines and oil lines. The use of fuel treasure can fully burn the fuel and increase the use efficiency of the fuel. The use of turbocharging can make the kinetic energy of an internal combustion engine more powerful and increase the use efficiency. Frequent cleaning of the gas lines and the oil lines can also increase the efficiency of the fuel and increase the kinetic energy. However, the methods can only increase the efficiency a little from a surface in practical application, and cannot greatly increase the fuel utilization rate fundamentally. Therefore, how to recover the energy has always been an important technical issue and a development trend of future internal combustion engine technologies.

Solution to Problem

Technical Solution

The purpose of the present invention is to provide a high-efficiency and energy-saving internal combustion engine waste heat utilization technology, which makes full use of waste heat of an internal combustion engine and waste heat of exhaust gas to generate high-pressure gas through a substance with low boiling point under normal pressure to push steam turbines to output kinetic energy, i.e., converts the recovered waste heat into the kinetic energy so as to increase the use efficiency of the fuel, improve the energy conversion rate of the internal combustion engine, save the energy and reduce the pollution of exhaust gas emission to the atmosphere.

The technical solution adopted to achieve the purpose of the present invention is as follows: a circulation system is installed on an internal combustion engine; the circulation system comprises a cooling medium, a cooling medium storage tank, a cooling medium delivery pipe, a circulation pump, a high-pressure pipeline, energy storage tanks, steam turbines and a radiator, the cooling medium is a substance with a low boiling point under normal pressure; the cooling medium storage tank is connected with a circulation pump through the cooling medium delivery pipe; the circulation pump is connected to a circulation liquid inlet of the internal combustion engine through a connecting pipe; a closed interlayer is arranged on an outer wall of an exhaust pipe of the internal combustion engine; a circulation liquid outlet of the internal combustion engine is connected to one end of the interlayer of the exhaust pipe, and the other end of the interlayer of the exhaust pipe is connected with the energy storage tank through the high-pressure pipeline; the energy storage tank is connected with the steam turbines; output ends of the steam turbines output kinetic energy; and a gas-liquid mixture after doing work enters a cooling fin, and is completely liquefied to enter the cooling medium storage tank for a next cycle.

The cooling medium is a liquid substance with a boiling point of 35 to 65° C. under normal pressure.

The cooling medium is preferably vinegar, methylene chloride, tert-butyl bromoacetate or methanol.

The steam turbines are one-stage or multi-stage steam turbines.

BENEFICIAL EFFECTS OF THE PRESENT INVENTION

Beneficial Effects

The present invention has the following positive effects: the entire system has simple structure, is easy to install, and can make full use of the waste heat of the internal combustion engine and the waste heat of the exhaust gas to generate high-pressure gas through the substance with low boiling point under normal pressure to push the steam turbines to output kinetic energy, i.e., converts the recovered waste heat into the kinetic energy so as to increase the use efficiency of the fuel, improve the energy conversion rate of the internal combustion engine, save the energy and reduce the pollution of exhaust gas emission to the atmosphere.

BRIEF DESCRIPTION OF THE DRAWINGS

Description of the Drawings

FIG. 1 is a working principle diagram of the present invention.

EMBODIMENTS OF THE INVENTION

Detailed Description of the Present Invention

The working principle of the present invention is shown in FIG. 1. A circulation system is installed on an internal combustion engine 4; the circulation system comprises a cooling medium, a cooling medium storage tank 9, a cooling medium delivery pipe 8, a circulation pump 7, a high-pressure pipeline 15, energy storage tanks 14, 12, steam turbines 13, 11, and a radiator 10; the cooling medium storage tank 9 is connected with a circulation pump 7 through the cooling medium delivery pipe 8; the circulation pump 7 is connected to a circulation liquid inlet of the internal combustion engine 4 through a connecting pipe 6; a closed interlayer 2 is arranged on an outer wall of an exhaust pipe 1 of the internal combustion engine 4; a circulation liquid outlet of the internal combustion engine 4 is connected to one end of the interlayer 2 of the exhaust pipe, and the other end of the interlayer 2 of the exhaust pipe is connected with a first energy storage tank 14 through the high-pressure pipeline 15; the first energy storage tank 14 is connected with a one-stage steam turbine 13; an output end of the one-stage steam turbine 13 outputs kinetic energy; high-pressure and high-temperature gas after doing work enters a second energy storage tank 12; second energy storage tank 12 is connected with a two-stage steam turbine 11; and a gas-liquid mixture after doing work enters the radiator 10 for cooling, and is completely liquefied to enter the cooling medium storage tank 9 for a next cycle.

The cooling medium is a liquid substance with a boiling point of 35 to 65° C. under normal pressure, such as dichloromethane and methanol. The cooling medium storage tank 9 is connected with the circulation pump through the cooling medium delivery pipe; and the circulation pump 7 is connected to the circulation liquid inlet of the internal combustion engine 4 through the connecting pipe 6.

INDUSTRIAL APPLICABILITY

When a machine is operated, the circulation pump 7 is started, and the cooling medium enters from the circulation liquid inlet of the internal combustion engine 4. The cooling medium which passes through the internal combustion engine 4 absorbs the waste heat of the internal combustion engine and is heated, and the cooling medium which comes out of the circulation fluid outlet of the internal combustion engine is preliminarily heated and then enters the interlayer 2 of the exhaust pipe to absorb the waste heat of exhaust gas again. Because the working temperature of the internal combustion engine is generally maintained at about 90° C. and the exhaust temperature of the internal combustion engine is generally several hundred degrees celsius, the medium preliminarily heated by the internal combustion engine 4 generally reaches the working temperature of about 90° C.; then the medium comes out to enter the interlayer 2 of the exhaust pipe, and is heated by the exhaust gas of several hundred degrees celsius. Because the temperature of the cooling medium is greatly increased and greatly exceeds the boiling point temperature of the medium, the pressure of the cooling medium which enters the high-pressure pipeline 15 and absorbs preheating is rapidly increased. The high-temperature and high-pressure cooling medium in the high-pressure pipeline 15 enters the first energy storage tank 14, and then is rapidly vaporized due to the sudden increase of the volume of a container, thereby forming high-temperature and high-pressure gas. The high-pressure gas enters the one-stage steam turbine 13, and the high-temperature and high-pressure gas passes through the one-stage steam turbine 13 to convert heat energy into kinetic energy for doing work, e.g., by using a connecting shaft or driving a generator to generate electricity or using a flexible transmission shaft to help a host to do work together (the content of this part is additionally applied for a patent). After the one-stage steam turbine 13 does work, the temperature and the pressure of the cooling medium are greatly reduced. The two-stage steam turbine 11 can also be arranged to reduce the temperature and the pressure. After the two-stage steam turbine 11 does work to reduce the temperature and the pressure, the gas-liquid mixture enters the radiator 10. The radiator 10 is provided with an electronic fan and a temperature sensor. The temperature sensor is set at a temperature lower than the liquefaction temperature of the cooling medium. If the cooling medium does not reach the liquefaction temperature after the two-stage steam turbine 11 reduces the temperature and the pressure, the electronic fan on the radiator 10 is started, and finally the cooling medium passing through the radiator 10 reaches the liquefaction temperature. The liquefied cooling medium enters the cooling medium storage tank 9 through the pipeline, and then enters a pipeline of the circulation system of the internal combustion engine. The temperature sensor 5 is installed at a cooling cylinder for cylinder combustion of the internal combustion engine. The temperature sensor is connected with the circulation pump 7. The working temperature of the internal combustion engine is set on the temperature sensor 5. If the working temperature of the internal combustion engine 4 is higher than the set temperature, the circulation pump 7 is started to work; and if the working temperature of the internal combustion engine 4 is lower than the set temperature, the circulation pump 7 stops working to ensure the normal work of the internal combustion engine.

What is claimed is:

1. A high-efficiency and energy-saving internal combustion engine waste heat utilization technology, wherein a circulation system is installed on an internal combustion engine; the circulation system comprises a cooling medium, a cooling medium storage tank, a cooling medium delivery pipe, a circulation pump, a high-pressure pipeline, energy storage tanks, steam turbines and a radiator, wherein the energy storage tanks comprise a first energy storage tank and a second energy storage tank, and the steam turbines comprise a one-stage steam turbine and a two-stage steam turbine;

the cooling medium is a substance with a low boiling point under normal pressure; the cooling medium is vinegar, methylene chloride, tert-butyl bromoacetate or methanol; the cooling medium storage tank is connected with a circulation pump through the cooling medium delivery pipe; the circulation pump is connected to a circulation liquid inlet of the internal combustion engine through a connecting pipe; a closed interlayer is arranged on an outer wall of an exhaust pipe of the internal combustion engine; a circulation liquid outlet of the internal combustion engine is connected to one end of the interlayer of the exhaust pipe, and the other end of the interlayer of the exhaust pipe is connected with the first energy storage tank through the high-pressure pipeline; the first energy storage tank is connected with the one-stage steam turbine; output ends of the one-stage steam turbine outputs kinetic energy converted from doing work of high-pressure and high-temperature gas; the one-stage steam turbine is connected with the second energy storage tank, the high-pressure and high-temperature gas after doing work in the one-stage steam turbine enters into the second energy storage tank from the one-stage steam turbine; the second energy storage tank is connected with the two-stage steam turbine; and a gas-liquid mixture after doing work in the two-stage steam turbine enters the radiator, and is completely liquefied to enter the cooling medium storage tank for a next cycle.

\* \* \* \* \*